United States Patent
Brixius et al.

(10) Patent No.: US 8,103,621 B2
(45) Date of Patent: Jan. 24, 2012

(54) HSM TWO-WAY ORPHAN RECONCILIATION FOR EXTREMELY LARGE FILE SYSTEMS

(75) Inventors: Carsten Brixius, Niedermoschel (DE); Dietmar Fischer, Woerrstadt (DE); Wayne C. Hineman, San Jose, CA (US); Christian Mueller, Dichtelbach (DE); Douglas S. Noddings, Export, PA (US); Wayne A. Sawdon, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 12/245,165

(22) Filed: Oct. 3, 2008

(65) Prior Publication Data

US 2010/0088271 A1 Apr. 8, 2010

(51) Int. Cl.
*G06F 17/00* (2006.01)
(52) U.S. Cl. ......................... 707/609; 707/662
(58) Field of Classification Search .................. None
See application file for complete search history.

(56) References Cited

U.S. PATENT DOCUMENTS

| | | | |
|---|---|---|---|
| 5,737,743 A | 4/1998 | Ooe et al. | |
| 5,983,239 A | 11/1999 | Cannon | |
| 6,336,120 B1 | 1/2002 | Noddings et al. | |
| 6,571,261 B1 | 5/2003 | Wang-Knop et al. | |
| 6,718,445 B1 | 4/2004 | Lewis et al. | |
| 6,751,261 B1 | 6/2004 | Olsson et al. | |
| 6,785,693 B2 | 8/2004 | DeLorme et al. | |
| 7,010,721 B2 | 3/2006 | Vincent | |
| 7,251,668 B2 | 7/2007 | Chen et al. | |
| 2002/0069280 A1* | 6/2002 | Bolik et al. | 709/225 |
| 2004/0163029 A1 | 8/2004 | Foley et al. | |
| 2007/0033237 A1 | 2/2007 | Prahlad et al. | |
| 2009/0249005 A1* | 10/2009 | Bender et al. | 711/162 |
| 2009/0319532 A1* | 12/2009 | Akelbein et al. | 707/10 |

* cited by examiner

*Primary Examiner* — Belix M Ortiz
(74) *Attorney, Agent, or Firm* — Kunzler Needham Massey & Thorpe

(57) ABSTRACT

One aspect of the present invention provides an operation for recovering lost space and maintaining data consistency in a storage environment by providing a two-way orphan reconciliation method for extremely large file systems, such as a Hierarchical Storage Management (HSM) system which manages billions of files. This highly scalable and parallelizable orphan identification process may be used in a HSM controlled environment to enable the execution of a two-way file orphan check. In one embodiment, this orphan check identifies file system client orphans and server object orphans in a single pass by comparing a queue containing a list of migrated files on a storage repository server with a queue containing a list of stub files on a file system. If the queue elements do not match, a file system orphan or server object orphan can appropriately be identified.

19 Claims, 6 Drawing Sheets

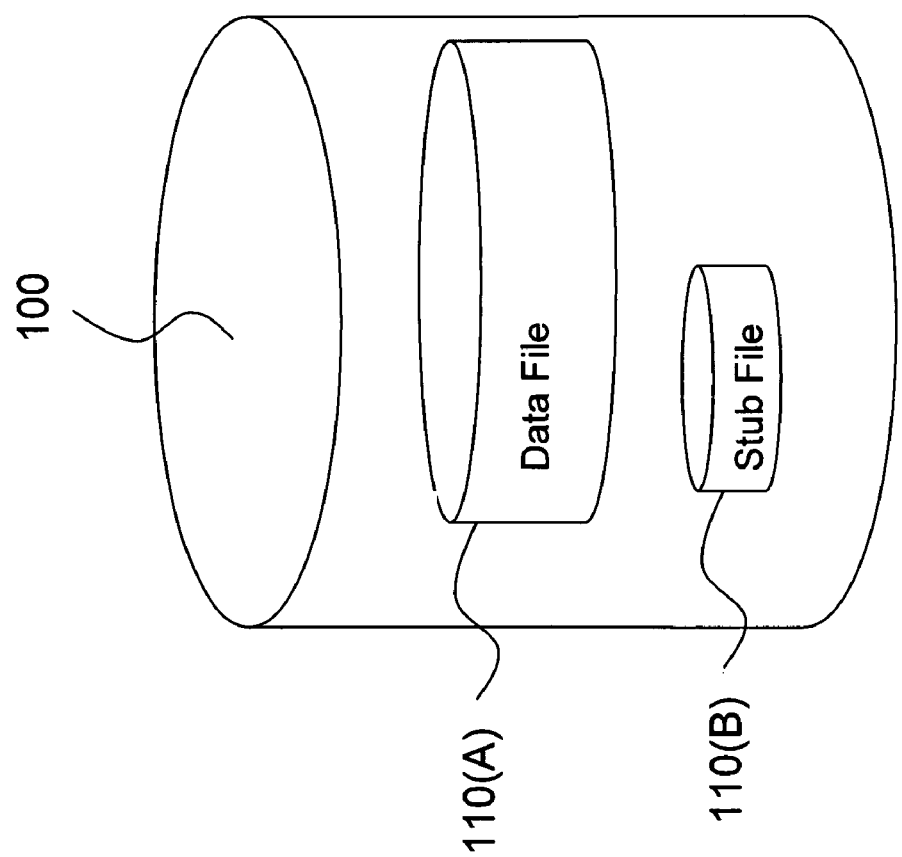

HSM TWO-WAY ORPHAN RECONCILIATION FOR EXTREMELY LARGE FILE SYSTEMS

FIELD OF THE INVENTION

The present invention generally relates to the field of data storage and management. The present invention more specifically relates to a method and a system for recovering lost space and maintaining data consistency by providing a two-way orphan reconciliation method for extremely large file systems, such as a Hierarchical Storage Management (HSM) controlled storage environment.

BACKGROUND OF THE INVENTION

HSM applications are used to manage efficient storage of data and migrate files between a hierarchy of storage devices in a storage repository, such as online storage and various forms of offline storage. HSM managed files are paired objects, with a local stub file paired with an associated object on the server containing the file contents. The local stub file remains in place of a migrated file after the file is migrated from its original storage location to a different storage location.

The stub file contains file attributes and information used to locate the migrated file contents in the repository storage location. The stub file contains all of the required file attributes as well as an index to a database that contains locator information. The HSM application is responsible for keeping the stub file updated in the event that the migrated file contents are moved to a new repository storage location.

The file system uses the stub file to access the original file contents, keeping subsequent migration and premigration of the file contents transparent to the users and applications accessing the file. It is the job of an HSM application to process requests to access migrated files. The HSM application uses the information and pointers stored in the stub file to recall the migrated file contents from the storage repository and deliver it to the initial location.

Over time, often as a result of data loss following system crashes or system configuration changes, the pairing of the local stub and its associated server object may be broken, resulting in file system client orphans and server object orphans. A server orphan is created by the deletion of the stub file in the file system on the HSM client side, which results in a server object no longer referenced by the file system HSM client. A file system client orphan is created by deletion of the corresponding object on the server side, which results in the stub file no longer having an associated server object.

Storage systems utilize data backup of the file system to reduce data loss, but restoring data from a backup does not eliminate file system corruption. The contents of the file system almost always change in the time period after a backup and before the restore, resulting in inconsistencies within the HSM file system.

HSM controlled storage environments require periodic system checks and routine maintenance to ensure file system integrity. Following a system crash or when any portion of the file system has been restored from a backup, the file system should be verified for data consistency. Each stub file needs to be verified that it points to a valid server object, and each server object needs to be verified that it has a corresponding stub file. Checking for both client and server orphans is called a two-way orphan check. Because the file system would not contain pointer information to access orphaned server objects, server orphans should be removed to avoid wasting storage space. Likewise, if there is no server object associated with the local stub file, the stub file should be flagged as a client orphan. The orphan checking process is very time consuming and requires significant system resources.

With the intent to avoid long running file system scans, existing systems take various approaches to check for both file system client orphans and server orphans. In some existing systems, client orphans and server orphans are identified serially, identifying each class of orphan in independent processes. In other existing systems, the independent orphan identification processes may be executed in parallel, but not in a single-pass process.

Another limitation in existing systems is that the methods used to identify orphans require caching of the entire list of file object pointers. As the number of files in the file system becomes larger, the size of the cache and the system resources required to manage the cache grows proportionally, rendering existing orphan checking systems practically infeasible for file systems containing billions of files.

Finally, existing systems are limited in their ability to identify orphans early in the orphan checking process. Early identification would allow parallel execution of tasks for potential recovery steps associated with the identified orphan. Existing systems require the entire list of file object pointers to be processed before it can be determined that an orphan exists.

What is needed in the art is a way to identify both server orphans and file system client orphans in extremely large file systems in a single pass. Further, the identification routine must be capable of matching a list of migrated files generated from the file system information with a list of migrated files generated from the storage repository information, where each list is sorted by a field such as a unique migrated file identifier.

BRIEF SUMMARY OF THE INVENTION

One aspect of the present invention provides a new and unique operation for performing HSM two-way orphan reconciliation within extremely large file systems, thereby providing techniques for maintaining file system integrity in an HSM controlled storage environment. One embodiment of the present invention includes a general mechanism for identifying both file system and server object orphans which may result from system crashes, system configuration changes, and the like. This embodiment achieves this result by not only identifying both file system and server object orphans in a single pass, but also by allowing the orphan identification process to be segmented for parallel processing. Single-pass identification and parallel processing within this embodiment is possible by utilizing a routine that matches a list of migrated files generated from the file system information with a list of migrated files generated from the storage repository information, where each list is sorted based on a unique migrated file identifier.

Initially, an HSM application is responsible for generating and maintaining a unique migrated file object identifier for each migrated file object present on the file system. This unique identifier is stored in both the file system stub file and with the migrated file object on the storage repository server.

Prior to executing the orphan identification routine, an HSM application utility calls a file system process to generate a list of migrated files present on the file system. The file system produces a list of migrated files that is ordered by unique migrated file object identifier. Next, the HSM application utility calls a server process with a query to obtain a list of all migrated objects on the server. The server produces a list of migrated objects that is ordered by unique migrated file object identifier.

The two lists, both sorted in ascending order by unique migrated file identifier, are placed in two respective queues, and compared by reading the first element from each list. If the elements are equal, no action is required, and the next elements from each list are compared. If the element from the file system list is smaller than the element from the server object list, then a possible file system orphan has been identified. If the element from the server object list is smaller than the element from the file system list, then a possible server orphan has been identified. Thus, the element with the smaller value is the orphan. Orphans can then be flagged and processed within the system accordingly.

If an orphan is identified, the operation continues looking for more orphans by comparing the larger element from the previous comparison with the next element from the other list. The operation continues comparing elements until all elements from both lists have been processed.

This two-way orphan check routine can be parallelized because both lists are sorted by unique migrated file identifier. Further, each list can be segmented by unique migrated file identifier, and various ranges of elements can be processed by different threads.

BRIEF DESCRIPTION OF THE DRAWINGS

FIG. 1A illustrates an example state of a storage volume utilized in one embodiment of the present invention;

DETAILED DESCRIPTION OF THE INVENTION

The presently disclosed operation of performing HSM two-way orphan reconciliation for extremely large file systems provides a general mechanism for identifying both file system client orphans and server object orphans, which can result from system crashes or system configuration changes, in a single pass. One embodiment of the present invention achieves this result by identifying both file system client orphans and server object orphans in a single pass operation, and further allows the orphan identification process to be segmented for parallel processing. The single pass orphan identification and parallel processing capability is achieved by utilizing a routine which matches a list of migrated files generated from the file system information with a list of migrated files generated from the storage repository information, where each list is sorted based on a unique migrated file identifier.

This embodiment therefore provides a highly scalable means to identify both file system client orphans and server object orphans in file systems containing billions of files. Because both lists are ordered based on the unique migrated file identifier, it is possible to do a direct comparison without having to cache either entire list. In a pristine file system where no migrated or premigrated files have been deleted, the entries in the two lists should be identical. Therefore, both file system client orphans and server orphans can be identified in a single pass by identifying gaps in the lists.

The descriptions and specific details that follow are set forth to provide a thorough understanding of the invention; nevertheless, the various aspects of the present invention may be practiced without these specific details. Additionally, the following notations will be used throughout the present disclosure to explain HSM migration operations according to one embodiment of the present invention, but are not intended to limit the scope of the present invention.

Referring to FIG. 1A, a "data file" 110(A) is any ordinary file stored on a volume 100 that may contain data provided by a user or application and which has not been migrated. When a data file is migrated from its originating storage location by an HSM application, a stub file is left in place of the data file. A migrated data file which has not been truncated is also referred to as a premigrated file.

A "stub file" 110(B) is a physical file that represents a migrated file. When a data file is migrated from the data file's originating storage location, the stub file is stored in the originating storage location to represent the migrated data file. The stub file may store some or all of the information that enables a migrated data file to be recalled. Other information used to locate migrated files may be stored in other data structures, but the stub file is typically the entity in the file system through which the original migrated file contents can be accessed by users and applications.

Figure 1B:
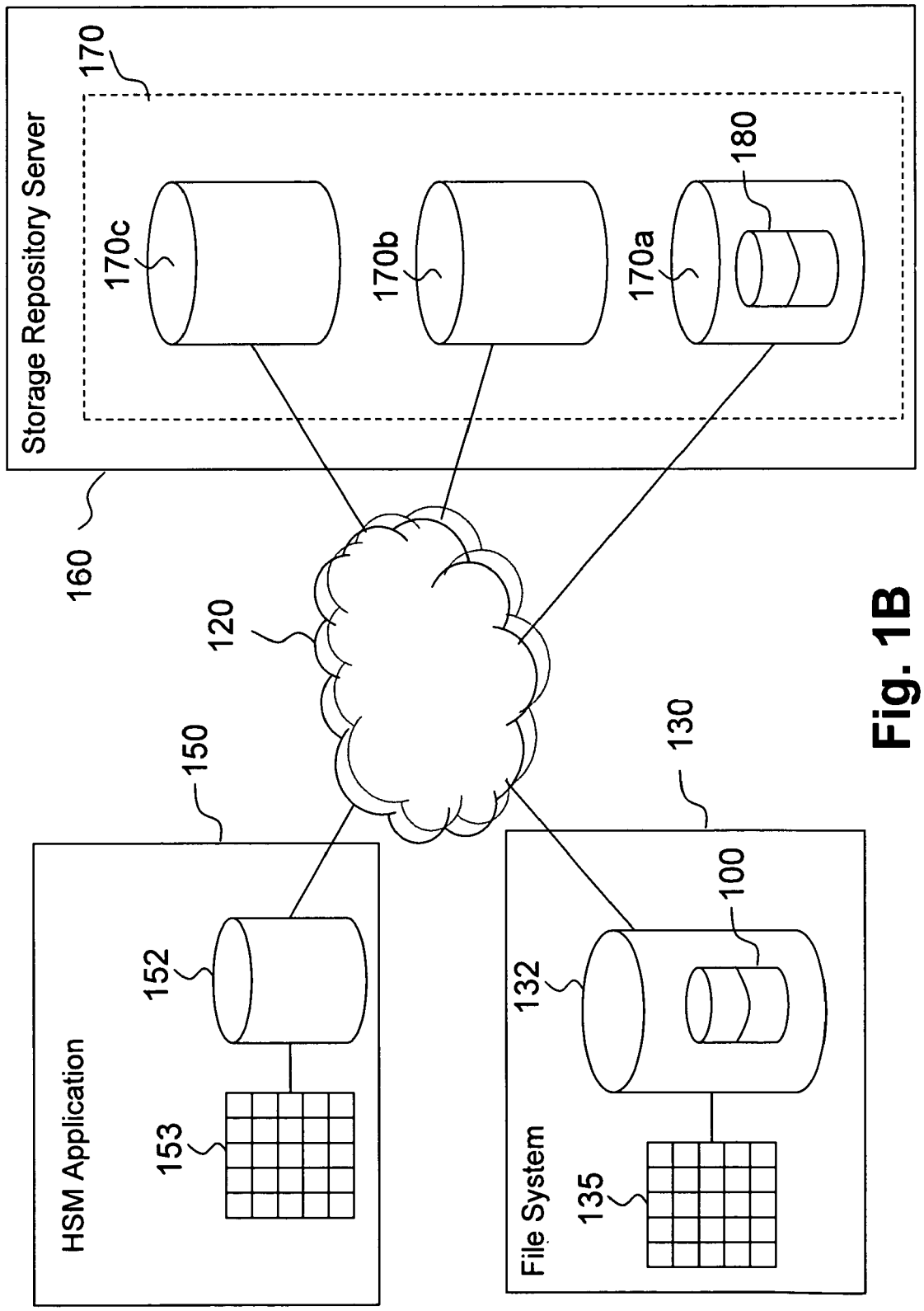
FIG. 1B illustrates an example operational environment for one embodiment of the present invention.

FIG. 1B depicts a block diagram of an example operational environment for one embodiment of the present invention, demonstrating a Hierarchical Storage Management (HSM) controlled environment operating over a network 120. The HSM controlled environment includes a file system 130 containing a storage structure 132 and a volume 100 where data files are stored following their creation, and a storage repository server 160 used by HSM application 150 to store migrated files. The storage repository server 160 accesses a storage repository 170 which may include multiple storage disks or similar types of storage media 170a, 170b, and 170c connected over the network. The primary storage disk 170a contains a volume 180 which stores a plurality of data objects associated with migrated files.

Figure 1C:
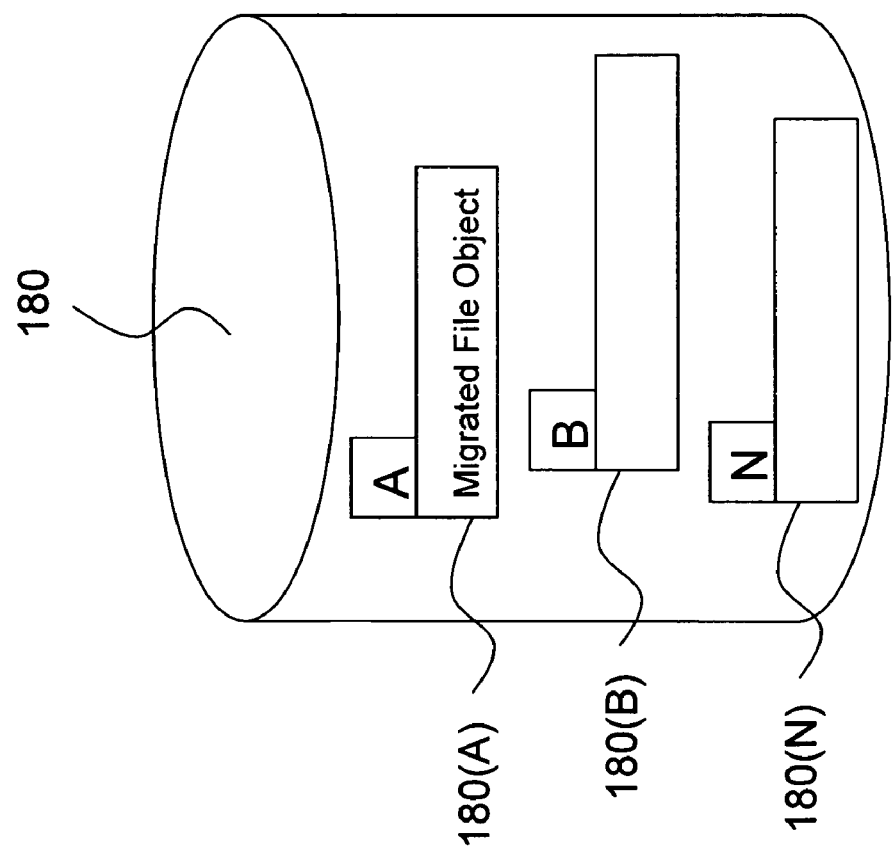
FIG. 1C illustrates an example state of a file system utilized in one embodiment of the present invention.
Figure 1D:
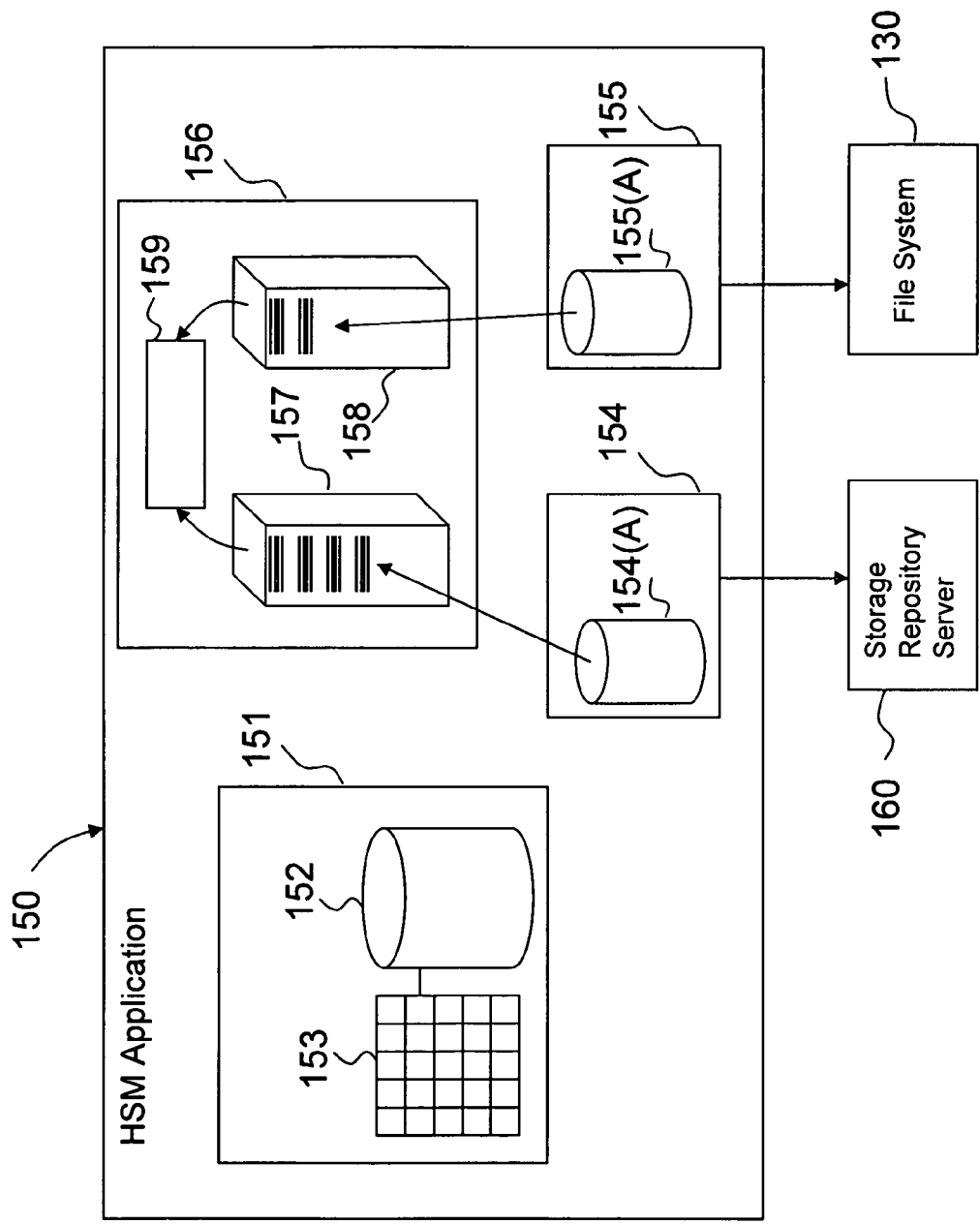
FIG. 1D illustrates an example operational environment for an HSM application utilized in one embodiment of the present invention.

Referring to the HSM controlled environment in FIG. 1B in combination with FIGS. 1A, 1C and 1D, the HSM application 150 is responsible for managing the migration, premigration and recall of data files (such as 110(A)) between the file system 130 and the storage repository server 160. This HSM management entails the creation of a unique migrated file identifier within an index 153 for each migrated file, updating a storage structure 152 that contains the unique migrated file identifier index and other information which tracks the location of migrated file objects (such as 180(A), 180(B) . . . 180(N)) stored on the storage repository volume 180 and throughout the HSM controlled environment, and the creation of stub files (such as 110(B)) which contain pointer information to the migrated file object. Depending on the implementation, the HSM application may also update other information within a file system catalog 135 to facilitate tracking of migrated file objects. Further, the HSM application replaces data files in the file system 130 with stub files (such as 110(B)) following the migration of a data file (such as 110(A)) to the storage repository server 160.

FIG. 1D depicts an example implementation environment of the present invention. One aspect of the present invention involves the use of the HSM application 150 and its associated routines 151, 154, 155, 156 and 159 to perform the HSM two-way orphan check. In the following description, for the purposes of explanation, specific details are set forth in order to provide an understanding of the invention. However, the present invention may be practiced in a similar manner with the addition, omission, or rearrangement of various steps and components.

Referring to FIG. 1D, in one embodiment of the present invention, the components utilized include an HSM application 150 containing several routines responsible for: (a) creating and managing migrated files 151; (b) sending migrated file list queries 154 to the storage repository server 160; (c) sending migrated file list requests 155 to the file system 130; and (d) managing queues 157 and 158 used for the comparison 159 of elements from each queue.

As depicted, an HSM application 150 contains the routines and data structures 151 to create and manage migrated files. According to one embodiment of the present invention, the HSM application creates a unique migrated file identifier within an index 153 for each migrated file. Both the file system 130 and the storage repository server 160 use the unique migrated file identifier to identify and track migrated files. In one embodiment, the unique migrated file identifier comprises a string of only upper case hex characters generated from unique attributes of the file, which facilitates a string comparison between a file system list and a storage repository server list of files. Because these lists are sorted, there is no need to store either list entirely in memory, and both lists can be processed one buffer at a time. Additionally, in a further embodiment, the unique migrated file identifier is stored internally in binary format, and these binary values could be compared individually in a compound statement to produce the same comparison results.

Figure 2:
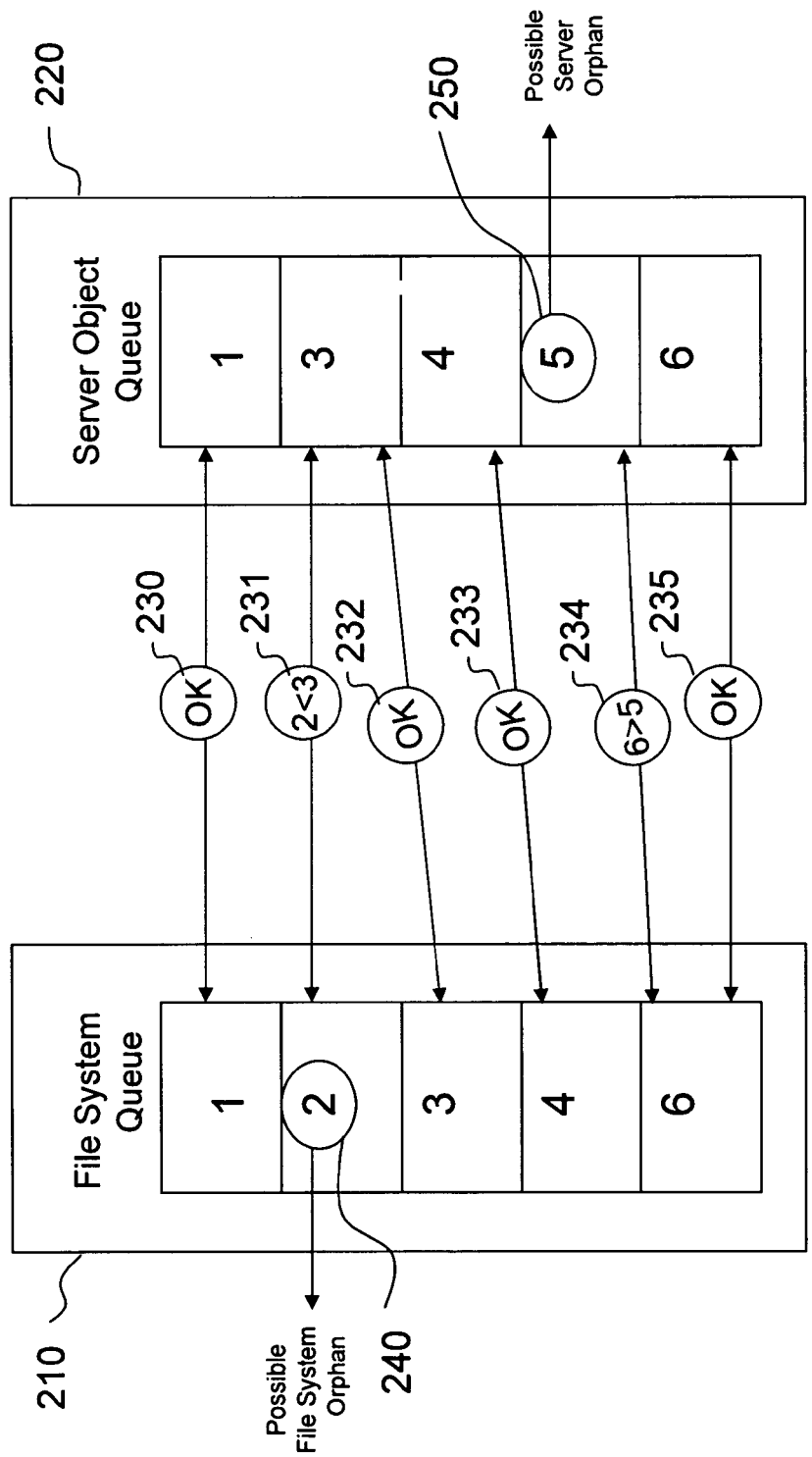
FIG. 2 illustrates an example two-way orphan reconciliation matching process in accordance with one embodiment of the present invention.

FIG. 2 depicts an example operation of a two-way orphan reconciliation matching process according to one embodiment of the present invention. In this embodiment, lists sorted by unique migrated file identifier are pushed onto queues 210 and 220 and matched in operations 230-235 to identify file system orphans (such as object 240) and server object orphans (such as object 250).

Figure 3:
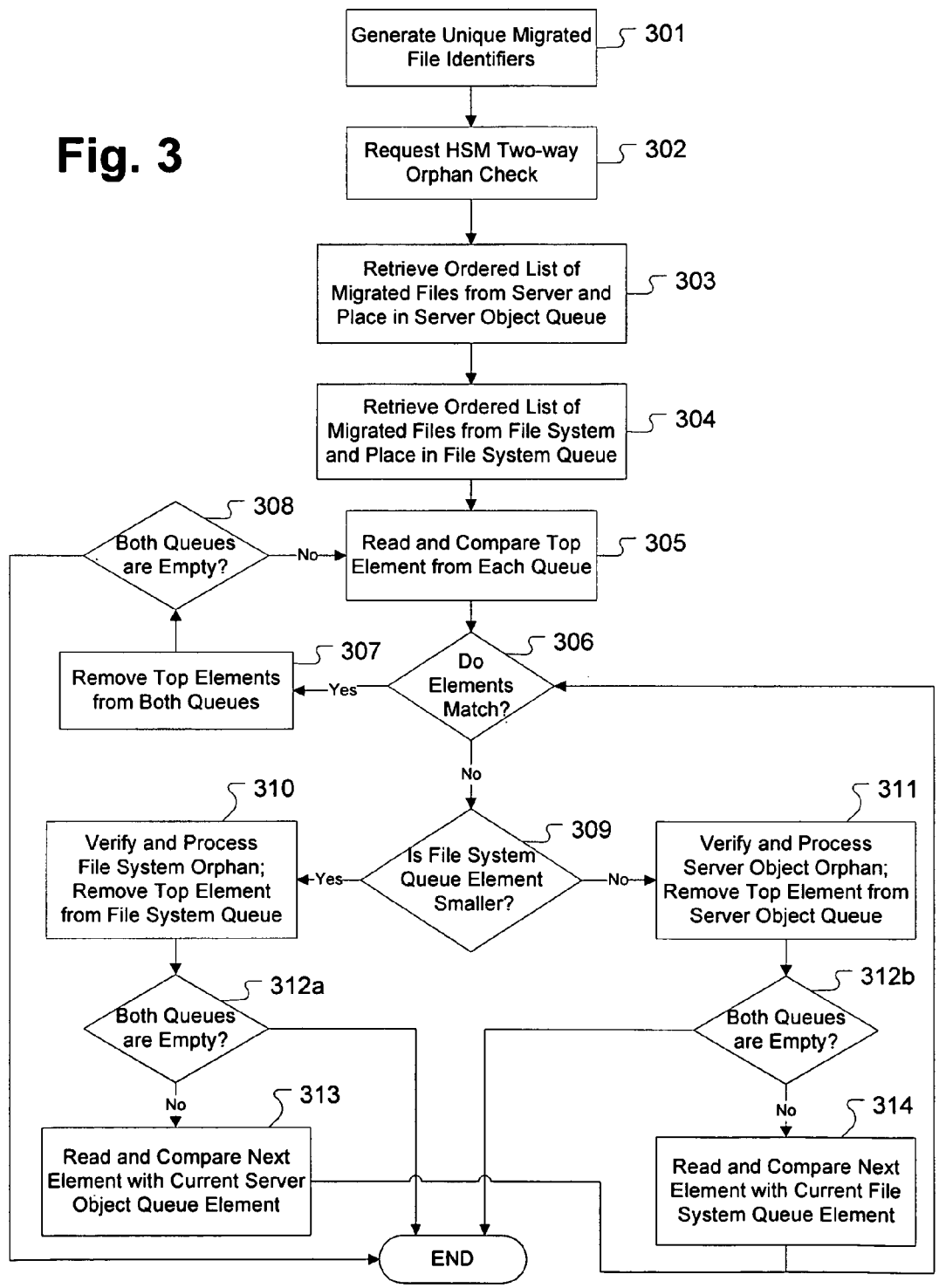
FIG. 3 illustrates a flowchart of an example operation of performing a single-pass HSM two-way orphan reconciliation for extremely large file systems in accordance with one embodiment of the present invention.

FIG. 3 depicts a workflow demonstrating an example operation for performing two-way orphan reconciliation. Referring to FIG. 3 in combination with FIGS. 1A, 1B, 1C, 1D, and FIG. 2, the steps used by the operation according to one embodiment of the invention are as follows.

As a prerequisite to the performance of this operation, an HSM controlled storage environment exists to manage the efficient storage of files and migrate files between various storage devices. The process begins when the HSM application 150 determines that a data file 110(A) stored in the file system 130 should be migrated to the storage repository server 160.

First, as in step 301, as a critical step to ensure the required indexing and data structures are in place for future processing, the HSM application 150 performs an HSM file indexing process which generates a unique migrated file identifier within index 153 for each data file 110(A) to be migrated. This unique migrated file identifier is stored both in the stub file 110(B) on the file system 130 and with the migrated data object 180(A) on the storage repository server 160. In one example of a further embodiment, the unique migrated file identifier comprises a hex string to enables a direct string value comparison in later steps.

Next, as in step 302, an HSM two-way orphan check processing operation, which is a component of the HSM application 150, is initiated upon receiving a request to check for data consistency. The request may be received from various sources, such as an administrator of the file system or various system utilities (e.g., system startup or backup-restore). In one embodiment, this request may be initiated within a command line executable interface, such as command within "dsmreconcile", supplying command line parameters to input data as required for the following operations.

As in step 303, the HSM application 150 starts a server object retrieval process 154 that queries the storage repository server 160 to retrieve a server object list 154(A) of migrated files ordered by the unique migrated file identifier 153. The results of the query are placed in a server object queue 157. The server query also delivers the expired and duplicated objects.

In parallel to step 303, step 304 involves the HSM application 150 starting a file system retrieval process 155 that accesses the file system 130 to retrieve a file system list 155(A) of files ordered by the unique migrated file identifier from index 153. The list results are placed in a file system queue 158. The file system list also includes data files that have not been migrated.

In parallel to steps 303 and 304, and as soon as both queues contain data, step 305 is performed by the HSM application 150 to initiate a single-pass orphan identification matching process. The top element from the server object queue 157 and the top element from the file system queue 158 are read and compared.

Next, as in step 306, a check is performed to determine if the read queue elements match. This may include checking the expiration interval of the migrated data object 180(A) from the storage repository server 160 to determine if it is expired. If expired, then the migrated data object on the storage repository server may be simply deleted, and the element may be removed from the server object queue, which would be followed by reading the new top element from the server object queue 157 and repeating step 305. As illustrated in FIG. 2, step 306 further involves comparing the elements read from each queue 210 and 220. If the elements are identical, then the operation proceeds to step 307 for the removal of the top elements from both queues. If the elements read from each queue are not identical, then further processing as in step 309 is performed.

In step 307, the comparison of the top element from each queue resulted in a match, therefore, no orphan exists, and no action is necessary. If both queues are now empty as in step 308, then the operation is complete. If additional items remain, the new top element from each queue is read and compared again as in step 305.

Step 309 occurs when the comparison of the top element from each queue results in no match. If the element from the file system queue 210 is smaller 231 than the element from the server object queue 220, then go to step 310 to determine if a possible file system orphan 240 has been identified. If the element from the file system queue is larger 234 than the element from the server object queue, or the file system queue is empty, then the operation goes to step 311 to determine if a possible server orphan 250 has been identified. If both queues are empty, as in steps 312a or 312b, then the process is complete.

In step 310, certain real-time file system checks are required before determining that a file system orphan 240 exists. First, a check if the file exists in the file system 160 is performed. Second, a check if the file is a migrated or pre-migrated file is performed. If the file exists and is migrated, then a file system orphan has been identified and the element should be put in an orphaned log file. If the file exists and is pre-migrated, then it is a data file and should be made resident. If the file does not exist in the file system, then no orphan exists because the file must have been deleted between the time period that the file system list 155(A) was generated and the server object list 154(A) was generated. Finally, in step 310, the top element is removed from the file system queue.

In step 311, similar real-time file system checks are required to verify that the file exists before determining that a server orphan 250 exists. If the file exists and is either migrated or pre-migrated, then no server orphan exists because the file must have been created and migrated between the time period that the file system list 155(A) was generated and the server object list 154(A) was generated. If the file does not exist, then a server orphan 250 has been identified. Next, appropriate action is taken to mark the object as expired, such as deleting the server object from the storage repository server 160, or taking other appropriate recovery actions.

As is queried in each of steps 308, 312a, and 312b, when both queues are empty and all elements have been read and processed from each queue, the orphan identification process is complete. However, if additional elements exist in either queue, the orphan identification process is continued. As in step 313, the new top element from the file system queue 210 is read and compared with the current server object queue element; or as in step 314, the new top element from the server object queue is read and compared with the current file system queue element. The process enumerated in steps 306-314 is then repeated until the queues are empty.

As suggested above, the processing that is performed for the file system orphan and the server object orphan may be configured to perform specific actions upon recognition of an orphaned object. In a further embodiment of the present invention, after discovery, server orphans are directly deleted. In another further embodiment of the present invention, the discovery of file system orphans is detailed in a log file, and the system administrator is informed via a message or via a user interface display.

In addition, a further embodiment of the present invention handles unexpected conditions which may arise within the operation of the above-described orphan check processing operation. One condition may occur when files are migrated after the file list has been created, but before the server query has started. The server list would include those data objects, but the file list would not, so the operation of the process described above would assume server orphans and delete the server objects, thereby causing a data loss. To address this, a file query can be executed before any server object is deleted, to ensure that there is no corresponding stub file.

An additional unexpected condition may occur where orphan stub files appear in the file list but are already deleted in the file system. These files would also be incorrectly reported as orphans, although they are no longer present in the file system. To address this, a file query can also be executed for orphan files to ensure sure that they are still present in the file system, so that the objects are reported as orphans only if this check succeeds. In case of pre-migrated orphan files, they are made resident, and not reported as orphans.

Additionally, according to a further embodiment, the orphan reconciliation process can be restarted, either from a checkpoint or from the beginning Where processing needs to be redone, such as from the last checkpoint forward or from the beginning, subsequent processing would create less work because all found server orphans will have already been processed (i.e., deleted) and will not be included in the following query result. Depending on the steps taken for file system orphan processing, the found file system orphans could also be resolved, causing fewer entries to require processing in next pass. (However, if the file list orphans are not resolved within first run, the orphans may be simply logged or alerted a second time.)

The processes described above constitute implementations of an operation for HSM two-way orphan reconciliation for extremely large file systems on a typical component configuration. Further embodiments of the present invention might be provided by those skilled in the art, for example, through the use of modified components within the storage management system, or the performance of additional operations such as event logging or various orphan recovery routines.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method for performing two-way orphan reconciliation in a Hierarchical Storage Management (HSM) controlled storage environment, comprising:
    operating an HSM application suite on a distributed storage system, the distributed storage system comprising a file system and a storage repository server connected over a network;
    migrating a plurality of data files with the HSM application suite from the file system to the storage repository server;
    performing a file indexing process with the HSM application suite to generate a unique migrated file identifier for each of the plurality of data files upon migration, wherein the unique migrated file identifier is stored in a stub file on the file system and in the migrated data file on the storage repository server;
    populating a server object queue with a list of the migrated data files stored on the storage repository server, the server object queue ordered by the unique migrated file identifier of the migrated data files;
    populating a file system queue with a list of the stub files stored on the file system, the file system queue ordered by the unique migrated file identifier of the stub files; and
    identifying file system orphans and server object orphans by executing a single-pass orphan identification matching process upon the server object queue and the file system queue that compares the unique migrated file identifier of server object queue elements with the unique migrated file identifier of file system queue elements.

2. The method of claim 1, wherein the step of identifying file system orphans and server object orphans comprises:
    completing the identification matching process if both queues are empty;
    determining if a unique migrated file identifier of a top element from the server object queue matches a unique migrated file identifier of a top element from the file system queue;
    removing the top element from both queues and repeating the identification matching process for remaining queue elements responsive to determining the unique migrated file identifier of the top elements from both queues match;
    determining if the top element from the file system queue contains a smaller unique migrated file identifier than the top element from the server object queue;
    responsive to determining the file system queue contains a smaller unique migrated file identifier:
        identifying the top element of the file system queue as a file system orphan;
        removing the top element from the file system queue, thereby making a next element within the file system queue as the top element of the file system queue; and
        repeating the identification matching process for remaining queue elements;
    responsive to determining the file system queue does not contain a smaller unique migrated file identifier:
        identifying the top element of the server object queue as a server object orphan;
        removing the top element from the server object system queue, thereby making a next element within the server object queue as the top element of the file system queue; and
        repeating the identification matching process for remaining queue elements.

3. The method of claim 1, wherein the unique migrated file identifier comprises a hex string.

4. The method of claim 1, wherein the steps of populating the server object queue and populating the file system queue are executed in parallel.

5. The method of claim 1, wherein the single-pass orphan identification matching process is performed in parallel by partitioning sequential ranges of the queues and assigning the ranges to different threads.

6. The method of claim 1, wherein recovery operations are launched responsive to identifying one or more orphans.

7. A system, comprising:
    at least one processor; and
    at least one memory which stores instructions operable with the at least one processor for performing two-way orphan reconciliation in a Hierarchical Storage Management (HSM) controlled storage environment, the instructions being executed for:
        operating an HSM application suite on a distributed storage system, the distributed storage system comprising a file system and a storage repository server connected over a network;
        migrating a plurality of data files with the HSM application suite from the file system to the storage repository server;
        performing a file indexing process with the HSM application suite to generate a unique migrated file identifier for each of the plurality of data files upon migration, wherein the unique migrated file identifier is stored in a stub file on the file system and in the migrated data file on the storage repository server;
        populating a server object queue with a list of the migrated data files stored on the storage repository server, the server object queue ordered by the unique migrated file identifier of the migrated data files;
        populating a file system queue with a list of the stub files stored on the file system, the file system queue ordered by the unique migrated file identifier of the stub files; and
        identifying file system orphans and server object orphans by executing a single-pass orphan identification matching process upon the server object queue and the file system queue that compares the unique migrated file identifier of server object queue elements with the unique migrated file identifier of file system queue elements.

8. The system of claim 7, wherein the step of identifying file system orphans and server object orphans comprises:
    completing the identification matching process if both queues are empty;
    determining if a unique migrated file identifier of a top element from the server object queue matches a unique migrated file identifier of a top element from the file system queue;
    removing the top element from both queues and repeating the identification matching process for remaining queue elements responsive to determining the unique migrated file identifier of the top elements from both queues match;

determining if the top element from the file system queue contains a smaller unique migrated file identifier than the top element from the server object queue;

responsive to determining the file system queue contains a smaller unique migrated file identifier:
- identifying the top element of the file system queue as a file system orphan;
- removing the top element from the file system queue, thereby making a next element within the file system queue as the top element of the file system queue; and
- repeating the identification matching process for remaining queue elements;

responsive to determining the file system queue does not contain a smaller unique migrated file identifier:
- identifying the top element of the server object queue as a server object orphan;
- removing the top element from the server object system queue, thereby making a next element within the server object queue as the top element of the file system queue; and
- repeating the identification matching process for remaining queue elements.

9. The system of claim 7, wherein the unique migrated file identifier comprises a hex string.

10. The system of claim 7, wherein the steps of populating the server object queue and populating the file system queue are executed in parallel.

11. The system of claim 7, wherein the single-pass orphan identification matching process is performed in parallel by partitioning sequential ranges of the queues and assigning the ranges to different threads.

12. The system of claim 7, wherein recovery operations are launched responsive to identifying one or more orphans.

13. A computer program product comprising a non-transitory computer readable storage medium having a computer readable program for performing two-way orphan reconciliation in a Hierarchical Storage Management (HSM) controlled storage environment, wherein the computer readable program when executed on a computer causes the computer to:
- operate an HSM application suite on a distributed storage system, the distributed storage system comprising a file system and a storage repository server connected over a network;
- migrate a plurality of data files with the HSM application suite from the file system to the storage repository server;
- perform a file indexing process with the HSM application suite to generate a unique migrated file identifier for each of the plurality of data files upon migration, wherein the unique migrated file identifier is stored in a stub file on the file system and in the migrated data file on the storage repository server;
- populate a server object queue with a list of the migrated data files stored on the storage repository server, the server object queue ordered by the unique migrated file identifier of the migrated data files;
- populate a file system queue with a list of the stub files stored on the file system, the file system queue ordered by the unique migrated file identifier of the stub files; and
- identify file system orphans and server object orphans by executing a single-pass orphan identification matching process upon the server object queue and the file system queue that compares the unique migrated file identifier of server object queue elements with the unique migrated file identifier of file system queue elements.

14. The computer program product of claim 13, wherein the step to identify file system orphans and server object orphans comprises:
- completing the identification matching process if both queues are empty;
- determining if a unique migrated file identifier of a top element from the server object queue matches a unique migrated file identifier of a top element from the file system queue;
- removing the top element from both queues and repeating the identification matching process for remaining queue elements responsive to determining the unique migrated file identifier of the top elements from both queues match;
- determining if the top element from the file system queue contains a smaller unique migrated file identifier than the top element from the server object queue;

responsive to determining the file system queue contains a smaller unique migrated file identifier:
- identifying the top element of the file system queue as a file system orphan;
- removing the top element from the file system queue, thereby making a next element within the file system queue as the top element of the file system queue; and
- repeating the identification matching process for remaining queue elements;

responsive to determining the file system queue does not contain a smaller unique migrated file identifier:
- identifying the top element of the server object queue as a server object orphan;
- removing the top element from the server object system queue, thereby making a next element within the server object queue as the top element of the file system queue; and
- repeating the identification matching process for remaining queue elements.

15. The computer program product of claim 13, wherein the unique migrated file identifier comprises a hex string.

16. The computer program product of claim 13, wherein the steps to populate the server object queue and populate the file system queue are executed in parallel.

17. The computer program product of claim 13, wherein the single-pass orphan identification matching process is performed in parallel by partitioning sequential ranges of the queues and assigning the ranges to different threads.

18. The computer program product of claim 13, wherein recovery operations are launched responsive to identifying one or more orphans.

19. The computer program product of claim 13, wherein the computer readable storage medium is non-transitory.

* * * * *